United States Patent
Razzaghi

(10) Patent No.: US 8,136,983 B2
(45) Date of Patent: Mar. 20, 2012

(54) SENSOR AND CONTROL SYSTEM

(76) Inventor: Mahmoud Razzaghi, San Diego, CA (US)

( * ) Notice: Subject to any disclaimer, the term of this patent is extended or adjusted under 35 U.S.C. 154(b) by 675 days.

(21) Appl. No.: 12/348,008

(22) Filed: Jan. 1, 2009

(65) Prior Publication Data

US 2010/0169050 A1    Jul. 1, 2010

(51) Int. Cl.
*G01K 7/16* (2006.01)
*G01K 7/42* (2006.01)

(52) U.S. Cl. ......... 374/103; 374/169; 374/185; 374/107

(58) Field of Classification Search ............. 374/103, 374/169, 185, 107
See application file for complete search history.

(56) References Cited

U.S. PATENT DOCUMENTS

| | | | | |
|---|---|---|---|---|
| 4,022,063 A | * | 5/1977 | West et al. | 374/158 |
| 4,068,526 A | * | 1/1978 | Goldstein | 374/169 |
| 4,092,863 A | * | 6/1978 | Turner | 374/169 |
| 4,464,932 A | * | 8/1984 | Ewing et al. | 73/204.15 |
| 4,727,500 A | * | 2/1988 | Jackson et al. | 702/131 |
| 4,984,460 A | * | 1/1991 | Isoda | 73/204.15 |
| 5,015,102 A | * | 5/1991 | Yamaguchi | 374/107 |
| 5,461,913 A | * | 10/1995 | Hinkle et al. | 73/204.25 |
| 5,725,308 A | * | 3/1998 | Smith et al. | 374/169 |
| 5,738,441 A | * | 4/1998 | Cambridge et al. | 374/102 |
| 6,059,452 A | * | 5/2000 | Smith et al. | 374/169 |
| 6,698,921 B2 | * | 3/2004 | Siefert | 374/169 |
| 2006/0224349 A1 | * | 10/2006 | Butterfield | 702/130 |

\* cited by examiner

*Primary Examiner* — Christopher Fulton

(57) ABSTRACT

A system is disclosed that essentially eliminates the delay in measurement of temperature by a sensor due to exponential response of the sensor. The system finds the rate of change of the sensor signal, multiplies it by the time constant of the sensor signal and adds the result to the instantaneous value of the sensor signal to predict the final value of the sensor signal or the actual value of the temperature. When the sensor is permanently attached to an object, the final temperature of the object is predicted in a similar manner using the combined time constant value of the sensor and the object. The system can be software, analog hardware or digital hardware. The system also allows more accurate temperature control without undershoot or overshoot by providing a control signal proportional to the difference between a desired value and the predicted final value of the sensor signal. The system similarly eliminates the time delay in measurement and control of flow in thermal flow meters.

19 Claims, 3 Drawing Sheets

SENSOR AND CONTROL SYSTEM

FIELD OF THE INVENTION

This invention relates to systems that their response to a stimulus approaches equilibrium exponentially and devices that measure their responses. Specifically, the invention relates to temperature sensors and thermal mass flow meters.

BACKGROUND OF THE INVENTION

A temperature sensor does not provide an immediate output corresponding to a change in its input. The response of such a sensor to a sudden change or a step input gradually approaches a final equilibrium value. This slow response is due to thermal inertia and varies exponentially relative to time.

A slow sensor may cause instability and reduced accuracy in a control system. By the time the sensor signals the control element to respond to a change in a parameter, the parameter may have already changed to a new value. In other words, the control system lags the change in the parameter. Larger lag is equivalent to less accurate control or instability.

In temperature control systems the accuracy of maintaining a specific temperature depends on the response time of the temperature sensor.

Thermal mass flow meters and controllers use heat transfer and change in temperature of a sensor system as the measuring means for the flow. U.S. Pat. Nos. 4,464,932, 4,984,460 and 5,461,913 are examples of these meters and controllers. Therefore, the measured flow has the same exponential profile as the response of temperature sensor. In a similar way, the accuracy and responsiveness of a flow controller using thermal mass flow meter depends on the response time of the temperature sensor.

A sensor with faster response allows better assessment and control of parameters and processes.

OBJECTS OF THE INVENTION

The objects of the invention include:

Essentially eliminating the delay in measurement of a parameter such as temperature of a system by a sensor due exponential response of the sensor. In other words, instantaneously providing the actual value of the parameter or the final value of the sensor response.

Instantaneously providing the final value of a system parameter such as temperature varying exponentially relative to time.

Improving the accuracy of temperature measurement and control systems beyond the existing limits.

Improving the accuracy of thermal mass flow meters and controllers beyond the existing limits.

BRIEF DESCRIPTION OF THE INVENTION

The invention provides a system that essentially eliminates the delay in measurement of temperature by a sensor due to exponential response of the sensor. The system finds the rate of change of the sensor signal, multiplies it by the time constant of the sensor signal and adds the result to the instantaneous value of the sensor signal to predict the final value of the sensor signal or the actual value of the temperature. When the sensor is permanently attached to an object, the final temperature of the object is predicted in a similar manner using the combined time constant value of the sensor and the object. The system can be software, analog hardware or digital hardware. The system also allows more accurate temperature control without undershoot or overshoot by providing a control signal proportional to the difference between a desired value and the predicted final value of the sensor signal. The system similarly eliminates the time delay in measurement and control of flow in thermal flow meters.

DETAILED DESCRIPTION OF THE INVENTION

The theory behind the invention is the mathematical relation developed by the inventor for an exponential function. According to this mathematical relation, in an exponential function, the asymptotic value or the final value of the function can be predicted by adding the instantaneous value of the function to the product of the derivative of the function and its time constant.

Based on the above, according to the invention there is a device that receives a signal, which is varying exponentially with time. The device differentiates the input, multiplies the differentiated input by the time constant of the signal and adds the result to the value of the input signal and delivers the result as the output. As an example, the signal can be the voltage from a temperature sensor system.

Suppose v is an exponential function of time t with a final value of $v_\infty$ and time constant $\tau$.

$$v = v_\infty(1 - e^{-t/\tau})$$

$$dv/dt = (v_\infty/\tau)e^{-t/\tau}$$

$$v + \tau dv/dt = v_\infty(1 - e^{-t/\tau}) + \tau(v_\infty/\tau)e^{-t/\tau}$$

$$v + \tau dv/dt = v_\infty$$

Figure 1:
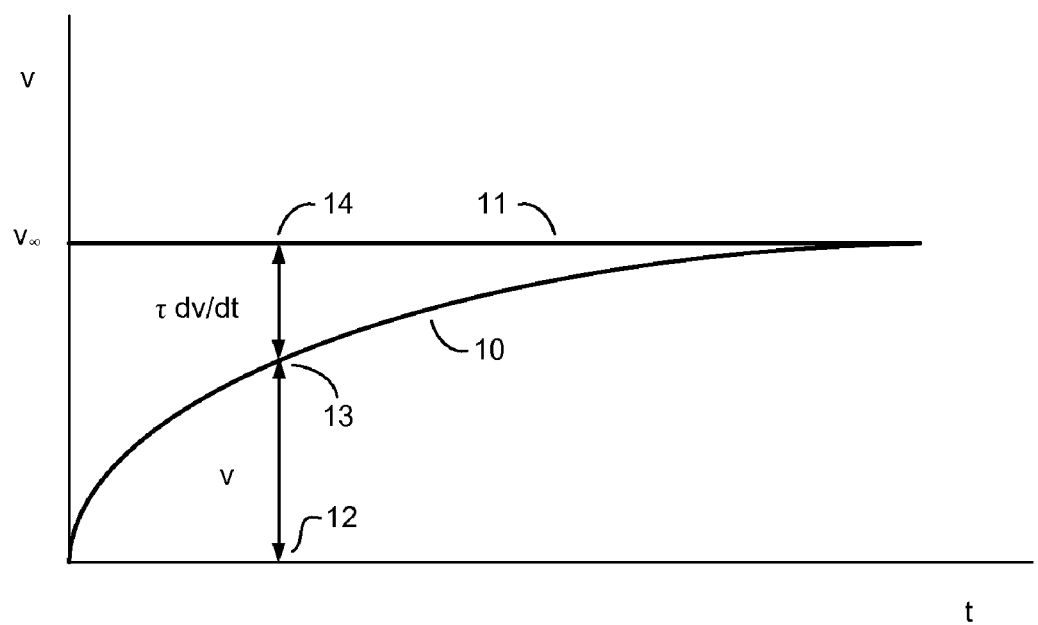
FIG. 1 shows the theory of the invention for a special case.
Figure 2:
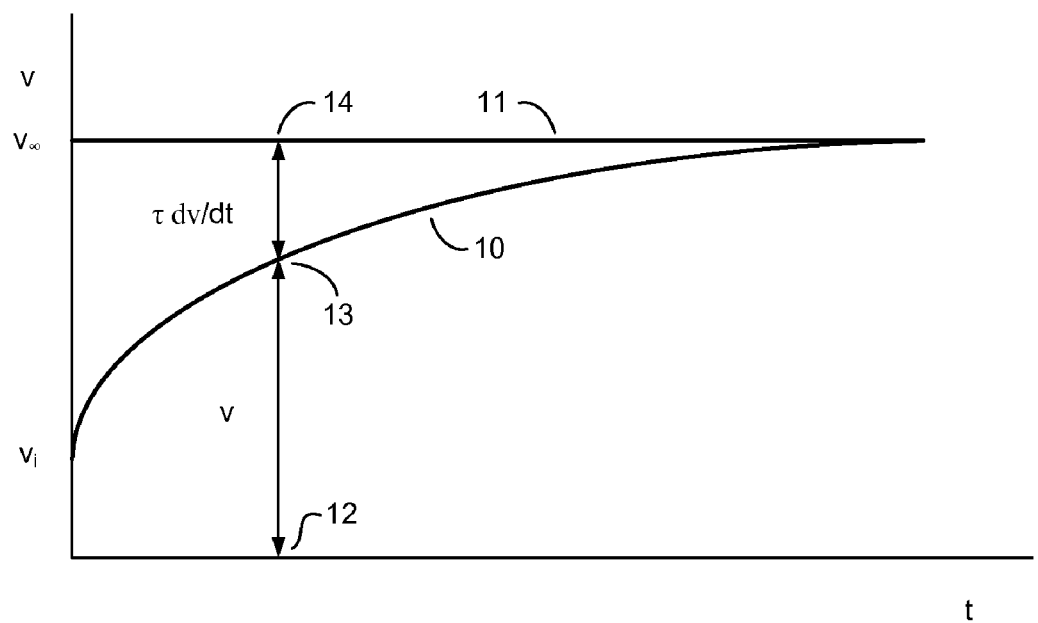
FIG. 2 shows the theory of the invention in general.

This relation is shown in FIG. 1. Curve 10 is the function v and line 11 is the final value $v_\infty$ of v. At any time 12 the final value at 14 is the sum of instantaneous value of v at point 13 and the product $\tau dv/dt$ between points 13 and 14.

This is a general relation and holds true for all conditions. When the function v is decreasing, the value of $\tau dv/dt$ is negative which reduces the instantaneous value of v to provide the lower final value $v_\infty$ of v.

As a more general case, when the initial value of v is not zero, $$v = (v_\infty - v_i)(1 - e^{-t/\tau}) + v_i$$

$$dv/dt = ((v_\infty - v_i)/\tau)e^{-t/\tau}$$

$$v + \tau dv/dt = (v_\infty - v_i)(1 - e^{-t/\tau}) + v_i + \tau((v_\infty - v_i)/\tau)e^{-t/\tau}$$

$$v + \tau dv/dt = v_\infty$$

Figure 3:
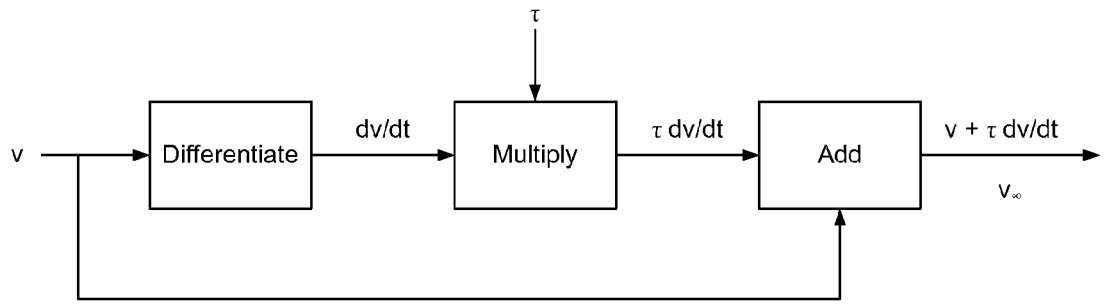
FIG. 3 shows a sensor block diagram of the invention.

The general method of the invention is shown in a block diagram in FIG. 3. Input signal v is a signal representing the response of a sensor such as a temperature sensor. Input signal v is differentiated with respect to time. Then the result is multiplied by the time constant T of the sensor. The result is added to the input signal v. The output signal represents $v_\infty$ or the final value of the sensor response.

As time passes by the slope of the function v approaches zero, and therefore, the product τdv/dt approaches zero. Thus, any inaccuracy is diminished upon time and the predicted value will be same as the actual final value.

The method described above can be performed by an analog circuit, a digital circuit or computer software.

Figure 4:
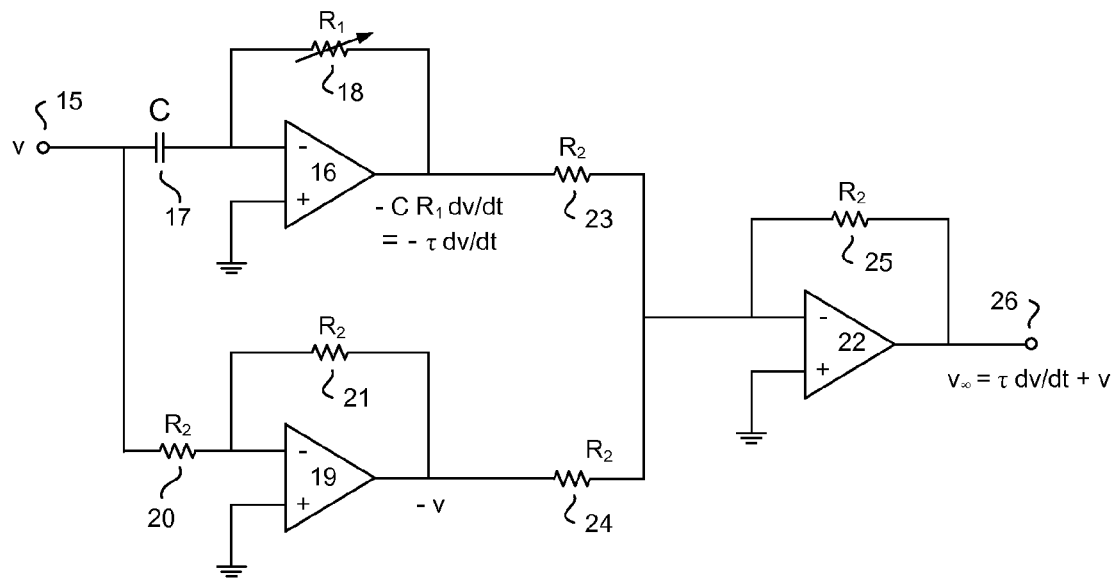
FIG. 4 shows a sensor analog circuit of the invention.

FIG. 4 shows an analog circuit of the invention. Signal v from the sensor is applied to the inverting terminal of amplifier 16 through capacitor 17 with capacitance C. The non-inverting terminal of amplifier 16 is grounded. Feedback resistor 18 connects the output of amplifier 16 to its inverting input. Amplifier 16, capacitor 17 and resistor 18 provide a differentiating circuit with the output $-CR_1 dv/dt$.

The product $CR_1$ can be chosen to represent $\tau$, the time constant of the sensor. Thus, the multiplication step of the method is performed concurrently at the differentiation stage.

Differentiating amplifier 16 functions in inverting mode and has negative output. For addition stage of the method, input signal v is also inverted to $-v$ by the inverting amplifier 19. Signal v is applied to the inverting terminal of amplifier 19 through resistor 20. Feedback resistor 21 connects output of amplifier 19 to its inverting input. Resistors 20 and 21 are equal. The non-inverting terminal of amplifier 19 is grounded.

The inverted outputs of amplifiers 16 and 19 are added together by the inverting amplifier 22 to obtain the sum of v and $CR_1 dv/dt$ as the final value of sensor signal or $v_\infty$.

$$v + CR_1 dv/dt = v_\infty$$

Outputs of amplifiers 16 and 19 are applied to the inverting terminal of amplifier 22 through resistors 23 and 24 respectively. Feedback resistor 25 connects the output of amplifier 22 to its inverting terminal. Resistors 23, 24 and 25 are equal. The non-inverting terminal of amplifier 22 is grounded.

Resistor $R_1$ is preferably variable to allow for adjustment or calibration of the circuit to match the time constant of the sensor. All other resistors can have the same value $R_2$.

As time passes by, the sensor signal slope approaches zero, and therefore, the product $CR_1 dv/dt$ approaches zero. Thus, any probable error is diminished upon time and the predicted value will be same as direct sensor value.

Calibration of the system is best performed by exposing the sensor to a known condition such as a piece with a fixed temperature. Resistor 18 is adjusted such that the output of the system represents the known value. Similarly, in a digital or software system, a value is entered as time constant τ such that the output of the system represents the known value.

For automatic calibration, the system is provided with additional hardware or software to record sensor signal and its derivative at a specific time. When the slope of the sensor signal approaches zero, the system records the sensor signal as the final value $v_\infty$. The time constant is then calculated by the following formula and stored in the system.

$$v + \tau dv/dt = v_\infty$$

When the sensor is permanently attached to an object, the final temperature of the object is predicted in a similar manner using the combined time constant value of the sensor and the object.

The value of τ depends on thermal inertia and coupling. However, in many cases it remains essentially invariant for the application of the invention. Examples include a sensor probe touching a solid surface for measuring the temperature of a solid body, a sensor immersed in fluid inside a container and a sensor attached permanently to a body of material with fixed weight and boundary conditions.

The possibility of predicting the final value allows improving control accuracy and stability by one or two orders of magnitudes. In a conventional control system, the set value is compared with the instantaneous value of the parameter and the control signal is proportional to their difference. In a control system using the principle of the invention, the set value is compared to the predicted final value. Thus, the system is controlled by the essentially exact value of control signal. There would be no overshoot or undershoot as in a conventional control system.

Figure 5:
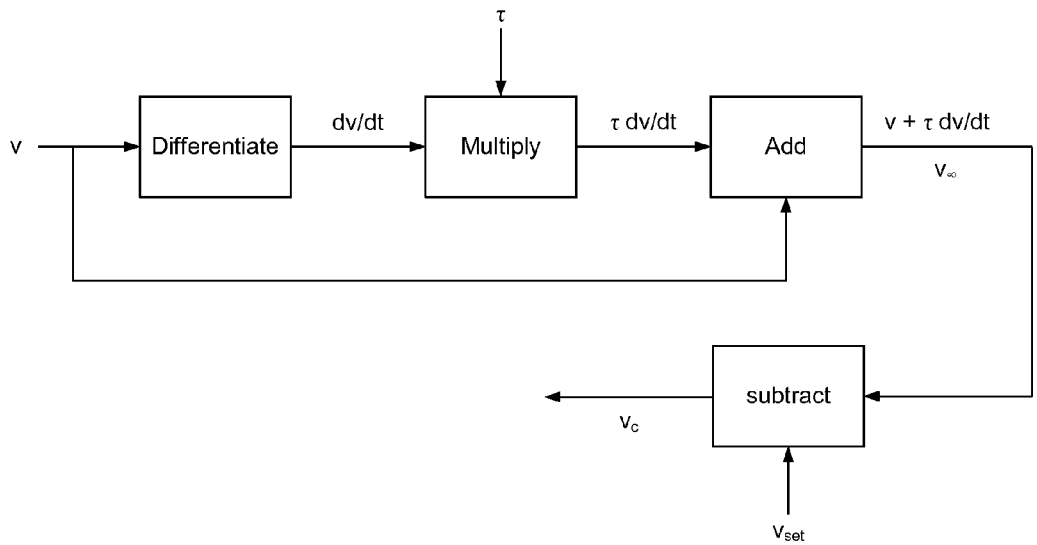
FIG. 5 shows a control block diagram of the invention.

The block diagram of a control system based on the principle of the invention is shown in FIG. 5. The final value is predicted as explained in the block diagram of FIG. 3. The final value $v_\infty$ and the set value $v_{set}$ are inputted to a differencing stage which provides the control signal $$v_c = v_{set} - v_\infty$$

To reach the desired value $v_{set}$ faster, a proportional system may be used until the instantaneous value reaches a given percentage of the desired value and then the predicted final value is used for precise and smooth approach to the desired value.

The method described above can be performed by an analog circuit, a digital circuit or computer software.

Figure 6:
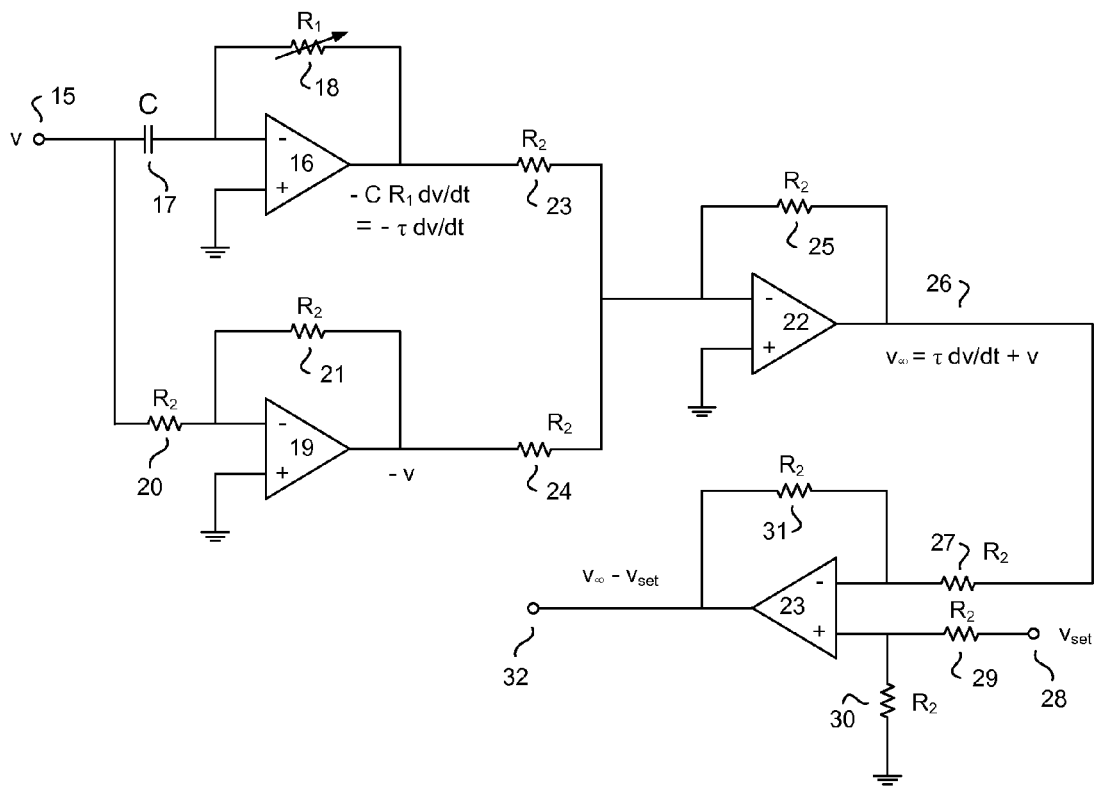
FIG. 6 shows a control analog circuit of the invention.

An analog circuit for the control system of FIG. 5 is shown in FIG. 6. The front end of this circuit is the same as explained in FIG. 4. The predicted final value $v_\infty$ at output 26 is applied to the inverting input of amplifier 23 through resistor 27. The desired value $v_{set}$ is applied to the non-inverting input of amplifier 23 through voltage divider resistors 29 and 30. Feedback resistor 31 connects the output of amplifier 23 to its inverting input. The combination is a differencing amplifier circuit which provides control output $$v_c = v_{set} - v_\infty$$

at the output 32 of amplifier 23.

The differencing amplifier circuit built around amplifier 23 is a typical example. Different variations are possible. For example an instrumentation amplifier may be used for differencing without the need for resistors 27, 29, 30, 31.

The principle and different embodiments of the invention can be similarly used in thermal mass flow meters and controllers and any system that measures or controls an exponentially varying parameter.

I claim:

1. A system to predict the final value of a signal varying exponentially with time and having a time constant, the system comprising:
    finding the rate of change of the signal with respect to time,
    multiplying the rate of change of the signal by the signal time constant, and
    adding the result of the multiplication to the present value of the signal.

2. The system of claim 1 wherein the signal represents temperature measured by a temperature sensor.

3. The system of claim 1 wherein the signal represents flow rate measured by at least one temperature sensor.

4. The system of claim 1 using a digital circuit.

5. The system of claim 1 using software.

6. The system of claim 1 using an analog circuit.

7. The system of claim 6 wherein:
    the rate of change of the signal and its multiplication by the time constant are obtained by a differentiating amplifier circuit,
    the addition is performed by a summing amplifier circuit,
    when required, the signal or the rate of change of the signal is inverted by an inverting amplifier before the addition.

8. The system of claim 7 wherein:
the differentiating circuit has a capacitor transferring the signal to the inverting input of a first amplifier and a feedback first resistor connecting the output of the first amplifier to its non-inverting input,
the product of capacitor and first resistor values represents the time constant of the signal,
the signal is also separately inverted by a second amplifier to match the inverted mode of the output of the first differentiating amplifier for the addition step, the signal is transferred to the inverting input of the second amplifier by a second resistor, the output of the second amplifier is connected through a feedback third resistor to its inverting input,
the summing circuit has a third amplifier which receives the outputs of the first and second amplifiers through a fourth resistor and a fifth resistor respectively, a sixth feed back resistor connects the output of the third amplifier to its inverting input, the non-inverting inputs of the first, second and third amplifiers are grounded.

9. The system of claim 8 wherein:
the second and third resistors have equal values,
the fourth, fifth and sixth resistors have equal values.

10. The system of claim 8 wherein the first resistor or capacitor is variable to allow adjustment or calibration of the system to the proper value of the signal time constant.

11. The system of claim 1 used in a control system wherein the control system provides a control signal proportional to the difference between the predicted final value and a given desired value of the signal.

12. A control system to control the value of a parameter varying exponentially with time and having a time constant, the parameter is represented by a signal from a sensor, the control system comprising:
a. predicting the final value of the signal by:
finding the rate of change of the signal with respect to time,
multiplying the rate of change of the signal by the signal time constant, and
adding the result of the multiplication to the present value of the signal,
b. providing a control signal proportional to the difference between a desired or preset value and the predicted final value of the parameter.

13. The system of claim 12 used to control the temperature of a medium as the parameter.

14. The system of claim 12 used to control the flow rate of a gas or liquid as the parameter, the flow signal is provided through at least one temperature sensor.

15. The system of claim 12 using a digital circuit.

16. The system of claim 12 using software.

17. The system of claim 12 using an analog circuit.

18. The system of claim 12 wherein:
in part (a):
the rate of change of the signal and its multiplication by the time constant are obtained by a differentiating amplifier circuit,
the addition is performed by a summing amplifier circuit,
when required, the signal or the rate of change of the signal is inverted by an inverting amplifier before the addition,
in part (b):
the differencing between the predicted final value and the desired value of the signal is obtained by a differencing amplifier circuit.

19. The system of claim 18 wherein:
in part (a)
the differentiating circuit has a capacitor transferring the signal to the inverting input of a first amplifier and a feedback first resistor connecting the output of the first amplifier to its non-inverting input,
the product of capacitor and first resistor values represents the time constant of the signal,
the signal is also separately inverted by a second amplifier to match the inverted mode of the output of the first differentiating amplifier for the addition step, the signal is transferred to the inverting input of the second amplifier by a second resistor, the output of the second amplifier is connected through a feedback third resistor to its inverting input,
the summing circuit has a third amplifier which receives the outputs of the first and second amplifiers through a fourth resistor and a fifth resistor respectively, a sixth feed back resistor connects the output of the third amplifier to its inverting input, the non-inverting inputs of the first, second and third amplifiers are grounded;
in part (b):
the differencing circuit has a fourth amplifier which receives the output of the third amplifier in part (a) through a seventh resistor and the desired value of the signal through a voltage divider set including an eighth resistor and a ninth resistor, the ninth resistor has a common node with the eighth resistor connected to the non-inverting input of the fourth amplifier and a grounded node, a tenth feedback resistor connects the output of the fourth amplifier to its inverting input.

\* \* \* \* \*